US010979535B1

(12) United States Patent
Miller et al.

(10) Patent No.: US 10,979,535 B1
(45) Date of Patent: Apr. 13, 2021

(54) DECOUPLED SELECTION OF CONTENT FOR SEMI-CONNECTED ELECTRONIC DEVICES

(71) Applicant: Amazon Technologies, Inc., Seattle, WA (US)

(72) Inventors: John Martin Miller, Seattle, WA (US); Deep Desai, Seattle, WA (US); Lucas Jacobs, Seattle, WA (US); Michael Lee Loritsch, Seattle, WA (US); Abhijeet More, Seattle, WA (US); Ross Tucker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 691 days.

(21) Appl. No.: 15/445,322

(22) Filed: Feb. 28, 2017

(51) Int. Cl.
*G06Q 30/00* (2012.01)
*H04L 29/08* (2006.01)
*G06Q 30/02* (2012.01)

(52) U.S. Cl.
CPC ....... *H04L 67/327* (2013.01); *G06Q 30/0275* (2013.01)

(58) Field of Classification Search
CPC ............ G06Q 30/0241; G06Q 30/0275; H04L 67/327
USPC .......................................................... 705/14
See application file for complete search history.

(56) References Cited

U.S. PATENT DOCUMENTS

| | | | | |
|---|---|---|---|---|
| 7,461,022 B1 * | 12/2008 | Churchill | ............... | G06Q 10/02 705/26.3 |
| 9,661,374 B1 * | 5/2017 | Erdmann | ........... | H04N 21/4331 |
| 10,110,675 B1 * | 10/2018 | Miller | ..................... | H04L 67/06 |
| 2005/0203824 A1 * | 9/2005 | Freud | ..................... | G06Q 30/08 705/37 |
| 2006/0271425 A1 * | 11/2006 | Goodman | .............. | G06Q 30/02 705/14.58 |
| 2007/0033269 A1 * | 2/2007 | Atkinson | ............... | G06Q 10/10 709/219 |

(Continued)

OTHER PUBLICATIONS

Infinity Tracking Launches Post Impression Call Tracking with DCM; Integration Quantifies Offline Conversations Advertising Campaigns Generate, Aug. 2, 2016, M2 Presswire, (Year: 2016).*

*Primary Examiner* — Matthew L Hamilton
(74) *Attorney, Agent, or Firm* — Eversheds Sutherland (US) LLP

(57) ABSTRACT

Systems, methods, and computer-readable media are disclosed for decoupled selection of content for semi-connected electronic devices. In one embodiment, an example method may include determining a set of candidate content for presentation at a semi-connected device, the set of candidate content comprising first content and second content of at least one content campaign, determining that an impression of the first content was served while the semi-connected device was disconnected from a network, determining that the first content and the second content were eligible for presentation at a first timestamp of a first impression interaction for the impression of the first content, determining a first bid amount for the first content and a second bid amount for the second content at a second timestamp of delivery of the first content to the semi-connected device, and determining a winning bid amount for the first impression interaction using the first bid amount and the second bid amount.

13 Claims, 5 Drawing Sheets

(56) References Cited

U.S. PATENT DOCUMENTS

| | | | | |
|---|---|---|---|---|
| 2007/0255617 A1* | 11/2007 | Maurone | ............... | G06Q 30/02 705/14.73 |
| 2008/0102947 A1* | 5/2008 | Hays | ..................... | A63F 13/12 463/31 |
| 2009/0006177 A1* | 1/2009 | Beaver | ................. | G06Q 30/02 705/14.6 |
| 2009/0006308 A1* | 1/2009 | Fonsen | ............... | H04W 60/06 |
| 2009/0043657 A1* | 2/2009 | Swift | .................... | G06Q 30/02 705/14.14 |
| 2009/0055749 A1* | 2/2009 | Chatterjee | ........... | G06F 3/04817 715/738 |
| 2011/0035259 A1* | 2/2011 | Das | ....................... | G06Q 30/02 705/14.41 |
| 2011/0161462 A1* | 6/2011 | Hussain | ................ | G06Q 30/02 709/219 |
| 2013/0275230 A1* | 10/2013 | Sawyer | ............. | G06Q 30/0269 705/14.66 |
| 2014/0143046 A1* | 5/2014 | Doe | ................... | G06Q 30/0277 705/14.48 |
| 2014/0164101 A1* | 6/2014 | S | ....................... | G06Q 30/0267 705/14.45 |
| 2015/0262221 A1* | 9/2015 | Nakano | ............. | G06Q 30/0246 705/14.45 |
| 2016/0358228 A1* | 12/2016 | Manavoglu | ........ | G06Q 30/0275 |
| 2018/0357678 A1* | 12/2018 | Diorio | ............... | G06Q 30/0275 |

\* cited by examiner

DECOUPLED SELECTION OF CONTENT FOR SEMI-CONNECTED ELECTRONIC DEVICES

BACKGROUND

Content may be presented on electronic devices to users such that users can consume the content. Users may consume or interact with certain content while other content may not be consumed or interacted with. Similarly, certain users may interact with certain content, while other users may not interact with the same content. Content may be presented on electronic devices that are not permanently or regularly connected to a network or other devices. Accordingly, serving content at such devices may be different than serving content at devices that are regularly connected to a network, and presenting relevant content at semi-connected devices may be difficult. Reflecting changes in value for user interaction with content presented at a particular semi-connected device may result in improved accuracy of data relating to impression interactions.

Figure 1:
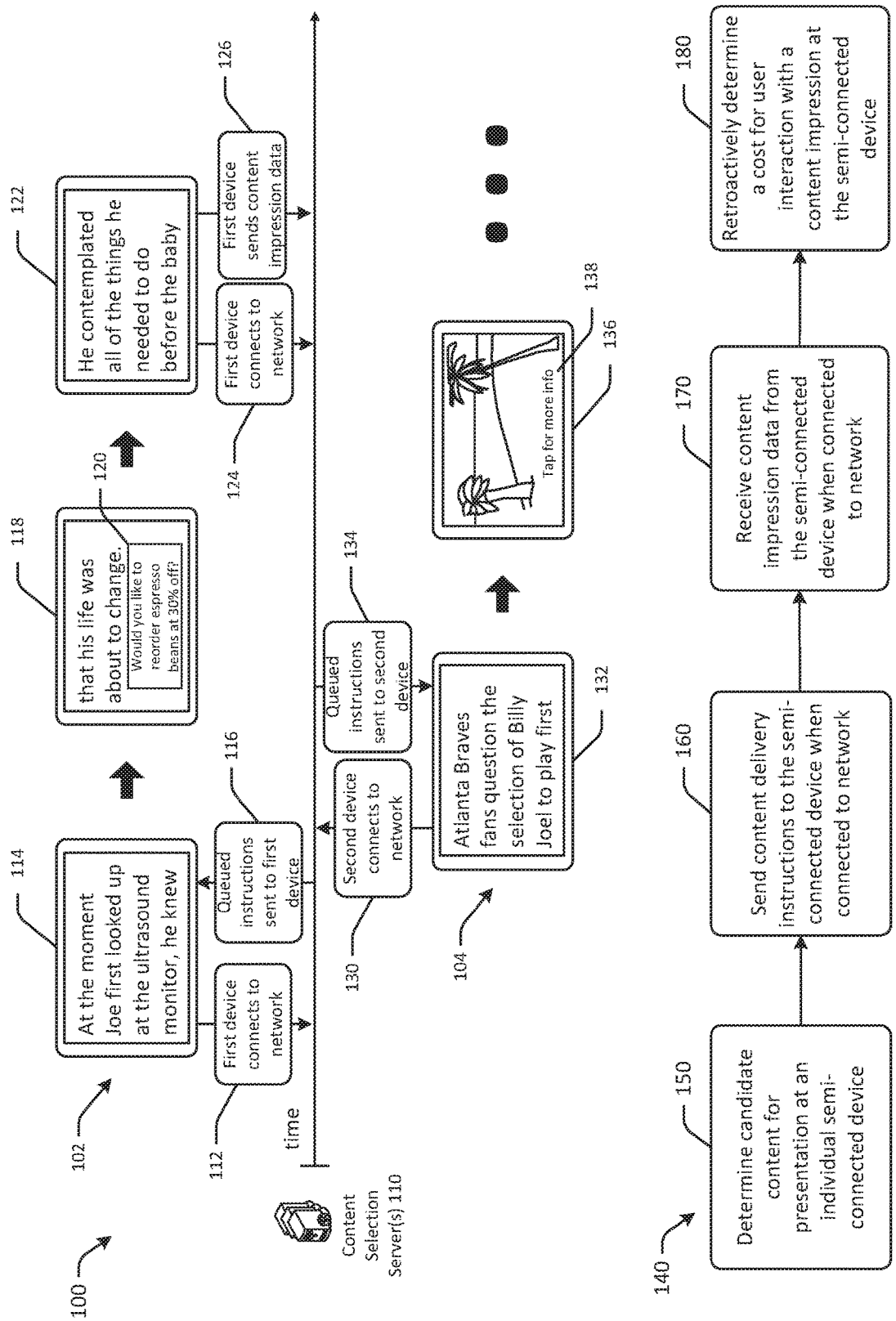
FIG. 1 is a hybrid system and process diagram illustrating decoupled selection of content for semi-connected electronic devices in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users may consume the digital content. Content may be provided as part of content campaigns by content creators that desire for the content to be consumed or interacted with by users. In some instances, delivery of content may be scheduled based at least in part on content delivery settings provided by campaign managers and/or content creators. Content delivery settings may include targeting criteria, frequency constraints (e.g., how often a content impression can be presented to a user, etc.), pacing settings (e.g., smooth or linear delivery, time of day delivery, etc.), device type settings (e.g., devices at which impressions are to be served), and the like. In some instances, content impressions may be formatted for or otherwise designated for delivery to semi-connected electronic devices. Semi-connected electronic devices, or semi-connected devices, may be devices that intermittently connect to a network, or that are not regularly connected to a network during operation. In one example, semi-connected devices may be devices that do not regularly connect to the internet, or that intermittently connect to the internet. Semi-connected devices may not regularly connect to the internet or another wired or wireless network during operation.

Campaign managers and/or content creators may provide initial content delivery settings for content associated with a content delivery campaign. The content delivery campaign may include one or more pieces of content, such as different creative materials or different forms or types of content, impressions of which may be delivered or presented to users at, in some instances, semi-connected devices. One or more remote servers may manage delivery and/or presentation of content over the course of a content delivery campaign. Campaign managers and/or content creators may manage content delivery settings based at least in part on an expected value that can be derived from serving a content impression to a user. The expected value may be used to determine an amount to pay, such as a bid amount, in order to serve a content impression to a user, and/or for user interactions with served impressions, such as clicks, taps, swipes, etc. In order to optimize usage or expenditure of resources allocated towards content served at semi-connected devices, campaign managers and/or content creators may desire to determine an accurate value for user interaction with content presented at a particular semi-connected device. Based at least in part on the determination, campaign managers and/or content creators may determine whether or not to change content delivery settings, such as a bid amount, in order to serve content at semi-connected devices.

Certain content may be configured for or otherwise designated for presentation at semi-connected devices. In order to optimize usage or expenditure of resources allocated towards content served at semi-connected devices while satisfying applicable constraints of a content delivery campaign, such as targeting criteria, budget consumption, pacing, and the like, determining an accurate value for user interaction with content presented at a particular semi-connected device may be desired. Similarly, determining an accurate value for user interaction with content presented at a particular semi-connected device may be used to satisfy campaign delivery settings. Determining whether or not to change content delivery settings, such as a bid amount, may be used to manage content delivery settings over the flight time or length of a content delivery campaign.

Embodiments of the disclosure may determine whether respective pieces of content of a set of candidate content for presentation at a particular semi-connected device were eligible for presentation at a time of an impression interaction for one of the pieces of content. Eligibility may be based at least in part on content delivery settings for the respective pieces of content of the set of candidate content. For example, certain pieces of content may be determined to have been eligible for presentation at the time of the impression interaction based on the respective flight times of such pieces of content, while other pieces of content may be determined to have been ineligible for presentation at the time of the impression interaction based on the respective flight times of such pieces of content. Based at least in part on the eligibility of the respective pieces of content for presentation at a particular semi-connected device, certain embodiments may determine respective bid amounts for the eligible pieces of content at a time of delivery of the set of candidate content to the particular semi-connected device. Embodiments of the disclosure may also determine a winning bid amount for the impression interaction based on one or more of the respective bid amounts for the eligible pieces of content of the set of candidate content.

Semi-connected devices, such as those described in this disclosure, are distinguished from devices such as web-based computers and other devices that rely on network connectivity to serve content because content and metadata must be downloaded by and/or cached on individual semi-connected devices during online windows or periods of connectivity for later offline or disconnected use. Accordingly, embodiments of the disclosure may select certain content for an individual device offline in advance of the respective device's connection and/or download cycle.

In an online, always-connected environment, eligibility of respective pieces of content of a set of candidate content and respective bid amounts for the eligible content may be determined immediately before content is delivered to and presented at a particular electronic device. In this manner, a winning bid amount may be determined and recorded synchronously at a time of content impression, and if the impression results in user interaction, the winning bid amount may be deducted from a user account for a content campaign associated with the content. For semi-connected devices, however, a set of candidate content may be delivered to a particular semi-connected device during a period of connectivity to a network, although a piece of content of the set of candidate content may not be presented at the semi-connected device until several hours or days after delivery when the semi-connected device is disconnected from the network. Accordingly, during a period of time between delivery of content and presentation of content, eligibility of respective pieces of content of the set of candidate content may change, and thus certain pieces of content may become irrelevant. Further, during a period of time between delivery of content and presentation of content, respective bid amounts for pieces of content of the set of candidate content may change when campaign managers and/or content creators change content delivery settings, which may affect a value for user interaction with content presented at the semi-connected device. Embodiments of the disclosure may therefore determine whether respective pieces of content of a set of candidate content for presentation at a particular semi-connected device were eligible for presentation at a time of an impression interaction for one of the pieces of content. Embodiments of the disclosure may also determine respective bid amounts for the eligible pieces of content at a time of delivery of the set of candidate content to the particular semi-connected device. Embodiments of the disclosure may determine a winning bid amount for the impression interaction based on one or more of the respective bid amounts for the eligible pieces of content of the set of candidate content. In this manner, determining eligibility of respective pieces of content of a set of candidate content for presentation at a particular semi-connected device may be decoupled from determining a winning bid amount for an impression interaction for one of the pieces of content.

As a result, embodiments of the disclosure may determine an accurate value for user interaction with content presented at a particular semi-connected device. In this manner, embodiments of the disclosure may consider changes in eligibility of respective pieces of content of a set of candidate content for presentation at a particular semi-connected device and may reflect changes in value for user interaction with content impressions. Further, embodiments of the disclosure may avoid providing campaign managers and/or content creators with misleading feedback with respect to bidding behavior and content selection results, and also may avoid unfair advantages in content selection. Based on the feedback provided, campaign managers and/or content creators may determine whether or not to change content delivery settings, such as a bid amount, in order to serve content at semi-connected devices. In this manner, campaign managers and/or content creators may manage content delivery settings in order to optimize usage or expenditure of resources allocated towards content served at semi-connected devices.

This disclosure relates to, among other things, systems, methods, computer-readable media, techniques, and methodologies for decoupled selection of content for semi-connected devices. Embodiments may determine eligibility of respective pieces of content of a set of candidate content for presentation at a particular semi-connected device and separately determine a winning bid amount for an impression interaction for one of the pieces of content. Embodiments may determine whether respective pieces of content of a set of candidate content for presentation at a particular semi-connected device were eligible for presentation at a time of an impression interaction for one of the pieces of content. Embodiments may determine a winning bid amount for the impression interaction based on one or more of the respective bid amounts for the eligible pieces of content of the set of candidate content at a time of delivery of the set of candidate content to the particular semi-connected device. In this manner, embodiments may determine an accurate value for user interaction with content presented at a particular semi-connected device. Over the flight time of a content campaign, content delivery settings may be managed based on feedback with respect to bidding behavior and content selection results, such that campaign managers and/or content creators may optimize usage or expenditure of resources allocated towards content served at semi-connected devices.

Referring to FIG. 1, an example system 100 illustrating decoupled selection of content for semi-connected electronic devices is depicted. The system 100 may include one or more servers and at least one or a plurality of semi-connected devices that intermittently connects to the server. In the example of FIG. 1, one or more content selection servers 110 may be in communication with one or more semi-connected devices. The one or more semi-connected devices may connect to or communicate with the content selection server 110 intermittently or on an irregular basis. For example, the semi-connected devices may be e-reader devices that are not used daily, or another type of device that is used to consume locally stored content. In FIG. 1, the content selection server 110 may be in irregular communication with a first semi-connected device 102 and a second semi-connected device 104. The first semi-connected device 102 and the second semi-connected device 104 may be devices such as tablets that do not include cellular connection hardware, in one example. The first semi-connected device 102 and the second semi-connected device 104 may periodically, or irregularly, initiate communication with the content selection server 110. In some instances, the content selection server 110 may initiate communication with either or both the first semi-connected device 102 or the second semi-connected device 104.

For example, at a first operation 112 in FIG. 1, the first semi-connected device 102 may connect to one or more networks. The one or more networks may facilitate communication between the first semi-connected device 102 and the content selection server 110. The first semi-connected device 102 may connect to the one or more networks, for example, to receive digital content for presentation at a first user interface 114. The digital content may be any suitable content, such as text content, image content, video content, and the like. After determining that the first semi-connected device 102 is connected, at a second operation 116 queued instructions may be sent to the first semi-connected device 102. The queued instructions may be sent from the content selection server 110. The queued instructions may include data related to one or more pieces of content for presentation at the first semi-connected device 102. The instructions may include content identifiers for the pieces of content to be presented, or may include content files or metadata for presentation as impressions. The one or more pieces of content selected for presentation at the first semi-connected device 102 may be selected based at least in part on content delivery settings and/or delivery constraints associated with the particular content campaigns associated with the selected pieces of content, and/or a predicted number of content impressions that the first semi-connected device 102 will serve.

The first semi-connected device 102 may receive the instructions that were queued and may execute the instructions to serve content impressions at available content delivery slots, such as in-app slots, banner slots, interstitial slots, etc. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. In one example, an available content delivery slot may be available when a user is browsing digital content with a location that is available for content to be presented. In FIG. 1, a second user interface 118 may include a first content delivery slot 120 that may be positioned between segments of the text content that is being presented and/or consumed by a user of the first semi-connected device 102. The first semi-connected device 102 may present a first content impression at the first content delivery slot 120 based at least in part on the instructions that were received from the content selection server 110. In FIG. 1, the content impression may be an offer to reorder espresso beans at a discount.

The first semi-connected device 102 may continue to present content at a third user interface 122. At a third operation 124, the first semi-connected device 102 may again connect to the one or more networks, for example, to receive additional content for presentation (e.g., a user of the first semi-connected device 102 may have selected a link, etc.). At a fourth operation 126, the first semi-connected device 102 may send content impression data to the content selection server 110. The content impression data may indicate which content impressions were presented by the first semi-connected device 102, how many content impressions were presented by the first semi-connected device 102, whether any user interaction with the presented content impressions was detected, and other information. In some embodiments, the first semi-connected device 102 may send the content impression data as soon as possible, such as during a subsequent connection time, or may batch content impression data and send the data periodically or after a certain amount of time has elapsed. The first semi-connected device 102 may continue to serve content impressions based at least in part on the instructions received from the content selection server 110, although the first semi-connected device 102 may not be connected to any network.

More than one semi-connected device may be in communication with the content selection server 110 at the same or at different times. The second semi-connected device 104 may connect to the one or more networks and/or the content selection server 110 at a fifth operation 130. For example, the second semi-connected device 104 may request content to present to a user. The content may be any suitable digital content. In the example of FIG. 1, text content may be presented at a first user interface 132 of the second semi-connected device 104. At a sixth operation 134, after the second semi-connected device 104 is connected, queued instructions may be sent to the second semi-connected device 104. The queued instructions may be sent from the content selection server 110, and may include instructions related to pieces of content that have been selected for presentation at the second semi-connected device 104 at content delivery slots. The instructions may include content identifiers for the pieces of content to be presented, or may include content files or metadata for presentation as impressions.

In the example of FIG. 1, the second semi-connected device 104 may present a second user interface 136 with a second content impression 138 that is presented based at least in part on the instructions received at the sixth operation 134. The second semi-connected device 104 may execute the instructions to serve content impressions at available content delivery slots, such as at the content delivery slot at which the second content impression 138 is presented. The second content impression 138 may include digital content, such as an image, with functionality, such as a selectable object for a user to interact with in order to receive additional information. The second semi-connected device 104 may continue to serve content impressions based at least in part on the instructions received from the content selection server 110, although the second semi-connected device 104 may not be connected to any network.

To determine an accurate value for user interaction with content presented at a particular semi-connected device, such as the first semi-connected device 102 or the second semi-connected device 104, the content selection server 110 may execute one or more process flows. For example, an example process flow 140 for determining an accurate value for user interaction with content presented at a particular semi-connected device is depicted in FIG. 1.

At block 150 of the process flow 140, the content selection server 110 may determine candidate content for presentation at an individual semi-connected device. For example, the content selection server 110 may determine a set of candidate content, including one or more pieces of content, for presentation at the individual semi-connected device. The content selection server 110 may select pieces of content of the set of candidate content from one or more content delivery campaigns being managed by, or that are otherwise available to, the content selection server 110. As an example, the content selection server 110 may be managing 15 content delivery campaigns and may select first content from a first content campaign, second content from a second content campaign, and third content from a third content campaign to be included in the set of candidate content for presentation at the individual semi-connected device. The content selection server 110 may determine the set of candidate content based at least in part on content delivery settings for content associated with content delivery campaigns being managed by the content selection server 110. The content selection server 110 may determine the set of candidate content for presentation at an individual semi-connected device in advance of the semi-connected device connecting to a network and/or communicating with the content selection server 110. The content selection server 110 may generate and queue delivery instructions to send to the individual semi-connected device when the semi-connected device is connected to the network and/or communicates with the content selection server 110.

At block 160 of the process flow 140, the content selection server 110 may send content delivery instructions to the individual semi-connected device when the semi-connected device is connected to the network. For example, the content selection server 110 may send content delivery instructions previously generated and queued by the content selection server 110 while the individual semi-commented device was disconnected from the network. The content delivery instructions may include data related to the respective pieces of content of the set of candidate content for presentation at the individual semi-connected device. The content delivery instructions may include content identifiers for the content to be presented, or may include content files or metadata for presentation as impressions. Continuing with the above example, the content delivery instructions may include a first content identifier for the first content, a second content identifier for the second content, and a third content identifier for the third content. The content delivery instructions also may include metadata related to the respective pieces of content of the set of candidate content. For example, the content delivery instructions may include metadata relating to a ranking of the pieces of content of the set of candidate content or respective ranking scores for the pieces of content of the set of candidate content. The ranking or the ranking scores may be based at least in part on bid amounts for the respective pieces of content of the set of candidate content. For example, the ranking score for a piece of content may be determined at least in part by multiplying a bid amount for the piece of content by a conversion rate for the piece of content. The conversion rate for a piece of content may be a click-through rate for the piece of content. In other words, the conversion rate for a piece of content may be a ratio of clicks to impressions for the piece of content over a period of time. Continuing with the above example, the first content may have a bid amount of 70 and a conversion rate of 0.1, the second content may have a bid amount of 50 and a conversion rate of 0.1, and the third content may have a bid amount of 30 and a conversion rate of 0.1. Accordingly, the first content may have a ranking score of 7, the second content may have a ranking score of 5, and the third content may have a ranking score of 3. In some embodiments, the content delivery instructions may include content identifiers and metadata related to ranking scores for the respective pieces of content of the set of candidate content.

The content delivery instructions may direct the individual semi-connected device to download content metadata and/or creative images for the respective pieces of content of the set of candidate content. For example, the individual semi-connected device may be directed to download content metadata and/or creative images for the respective pieces of content of the set of candidate content from a content server. For each piece of content downloaded to the individual semi-connected device, a download confirmation may be generated. The download confirmation may include the content identifier for the piece of content and a download timestamp indicating a time of delivery of the piece of content to the individual semi-connected device. The download confirmation may be received by the content selection server 110 from the content server or the semi-connected device. The content selection server 110 may generate and store a content history related to the bid amount and the time of delivery of each piece of content to the semi-connected device. For example, the content history may include the content identifier, the bid amount, the ranking score, and the download timestamp for the respective pieces of content of the set of candidate content delivered to the semi-connected device.

The semi-connected device may present the pieces of content of the set of candidate content in a specific order. For example, the semi-connected device may present the pieces of content of the set of candidate content in a specific order based at least in part on the respective ranking scores of the pieces of content. In some embodiments, the content selection server 110 may rank the pieces of content of the set of candidate content based at least in part on their respective ranking scores, and the content delivery instructions may include metadata related to the ranking of the pieces of content. In certain embodiments, the semi-connected device may independently rank the pieces of content of the set of candidate content based at least in part on their respective ranking scores provided by the content delivery instructions received from the content selection server 110. Continuing with the above example, the semi-connected device may present the pieces of content of the set of candidate content in the following order of presentation based on their respective ranking scores: the first content (having a ranking score of 7), the second content (having a ranking score of 5), and the third content (having a ranking score of 3). In some embodiments, the content selection server 110 and/or the semi-connected device may determine that two or more pieces of content of the set of candidate content have equal ranking scores and may rank the two or more pieces of content based on one or more secondary factors. The secondary factors may include flight times, conversion rates, budget consumption amounts, pacing constraints, and/or other settings or characteristics of the two or more pieces of content having equal ranking scores. In an example embodiment, the content selection server 110 and/or the semi-connected device may randomly select one of multiple pieces of content that have equal ranking scores or bid amounts. The semi-connected device may serve content impressions based at least in part on the content delivery instructions received from the content selection server 110, although the semi-connected device may not be connected to the network.

At block 170 of the process flow 140, the content selection server 110 may receive content impression data from the individual semi-connected device when the semi-connected device is connected to the network. The content impression data may include, for respective user interaction events with content presented at the semi-connected device, an indication of an impression interaction for a piece of content and a time of the impression interaction. For example, the content impression data may include, for respective user interaction events with content presented at the semi-connected device, the content identifier for the piece of content and an interaction timestamp indicating the time of the impression interaction. Continuing with the above example, based on an impression interaction for the first content, the content impression data may include the first content identifier and an interaction timestamp of the impression interaction for the first content. The semi-connected device may generate and store the content impression data for respective impression interactions that occur while the semi-connected device is disconnected from the network. The semi-connected device may send the content impression data to the content selection server 110 when the semi-connected device subsequently connects to the network and/or communicates with the content selection server 110.

At block 180 of the process flow 140, the content selection server 110 may retroactively determine a cost for user interaction with a content impression at the individual semi-connected device. For example, the content selection server 110 may determine a cost for each impression interaction indicated by the content impression data received from the individual semi-connected device. The content selection server 110 may determine a cost for an impression interaction by determining the set of candidate content for presentation at the semi-connected device at the time of the impression interaction, determining which pieces of content of the set of candidate content were eligible for presentation at the time of the impression interaction, and determining the bid amounts for the eligible pieces of content at the time of delivery of the pieces of content to the semi-connected device. The content selection server 110 may determine the time of the impression interaction using the interaction timestamp provided by the content impression data. The content selection server 110 may determine the set of candidate content for presentation at the semi-connected device using the content history. For example, the content selection server 110 may determine the set of candidate content based on the content identifiers and the download timestamps provided by the content history.

The content selection server 110 may determine eligibility of the pieces of content of the set of candidate content for presentation at the semi-connected device at the time of the impression interaction using the content delivery settings for the respective pieces of content of the set of candidate content and the interaction timestamp. For example, the content selection server 110 may determine that certain pieces of content were eligible for presentation at the time of the impression interaction based on the respective flight times of such pieces of content and the interaction timestamp, and the content selection server 110 may determine that other pieces of content were ineligible for presentation at the time of the impression interaction based on the respective flight times of such pieces of content and the interaction timestamp.

The content selection server 110 may determine the respective bid amounts for the eligible pieces of content of the set of candidate content at the time of delivery of the pieces of content to the semi-connected device using the content history. For example, the content selection server 110 may determine the respective bid amounts for the eligible pieces of content at the time of delivery of the pieces of content based on the bid amounts and the download timestamps provided by the content history. The content selection server 110 then may determine a cost for the impression interaction based on the respective bid amounts for the eligible pieces of content at the time of delivery. The content selection server 110 may rank the eligible pieces of content based on their respective ranking scores and determine the cost for the impression interaction based on the bid amount for the second-ranked eligible piece of content. For example, the content selection server 110 may determine the cost for the impression interaction to be a sum of the bid amount for the second-ranked eligible piece of content and an additional value. In some embodiments, the additional value may be 1. In some embodiments, the content selection server 110 may determine that two or more pieces of content of the set of candidate content have equal ranking scores and may rank the two or more pieces of content based on one or more secondary factors. The secondary factors may include flight times, conversion rates, budget consumption amounts, pacing constraints, and/or other settings or characteristics of the two or more pieces of content having equal ranking scores. In an example embodiment, the content selection server 110 and/or the semi-connected device may randomly select one of multiple pieces of content that have equal ranking scores or bid amounts.

Continuing with the above example, the content delivery server 110 may receive the content impression data indicating the first impression interaction for the first content and determine a cost for the first impression interaction. The content selection server 110 may determine the time of the impression interaction using the interaction timestamp and may determine that the set of candidate content includes the first content, the second content, and the third content based on the content identifiers and the download timestamps provided by the content history. The content delivery server 110 may determine that the first content and the second content were eligible for presentation at the time of the first impression interaction based on their respective flight times provided by the content delivery settings and the interaction timestamp, and that the third content was ineligible for presentation at the time of the impression interaction based on its flight time provided by the content delivery settings and the interaction timestamp. The content selection server 110 may determine the respective bid amounts for the eligible pieces of content at the time of delivery to be 70 for the first content and 50 for the second content based on the bid amounts and the download timestamps provided by the content history. The content selection server 110 may rank the first content and the second content based on their respective ranking scores (7 for the first content, and 5 for the second content) and determine the cost for the impression interaction to be 51 based on a sum of the bid amount for the second-ranked eligible piece of content (50 for the second content) and an additional value of 1.

By determining eligibility of respective pieces of content of a set of candidate content for presentation at a particular semi-connected device and a separately determining a cost for an impression interaction for one of the pieces of content, embodiments of the disclosure may determine an accurate value for user interaction with content presented at the particular semi-connected device. In this manner, embodiments of the disclosure may consider changes in eligibility of respective pieces of content of a set of candidate content for presentation at a particular semi-connected device and may reflect changes in value for user interaction with content impressions.

The systems, methods, computer-readable media, techniques, and methodologies for decoupled selection of content for semi-connected devices may provide campaign managers and/or content creators with accurate feedback with respect to bidding behavior and content selection results, and also may avoid unfair advantages in content selection. In this manner, campaign managers and/or content creators may effectively manage content delivery settings in order to optimize usage or expenditure of resources allocated towards content served at semi-connected devices.

Example embodiments of the disclosure provide a number of technical features or technical effects. For example, in accordance with example embodiments of the disclosure, certain embodiments of the disclosure may generate a content history that includes a content identifier, a bid amount, a ranking score, and a download timestamp for respective pieces of content of a set of candidate content for presentation at a particular semi-connected device. As a result, changes in value for user interaction with content presented at the particular semi-connected user device may be reflected in determining an accurate value of an impression interaction for one of the pieces of content of the set of candidate content, thereby avoiding misleading feedback with respect to bidding behavior and content selection results as well as unfair advantages in content selection. Embodiments of the disclosure may automatically execute or cause execution of logic at semi-connected devices to trigger downloads of content for which impressions are to be served. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
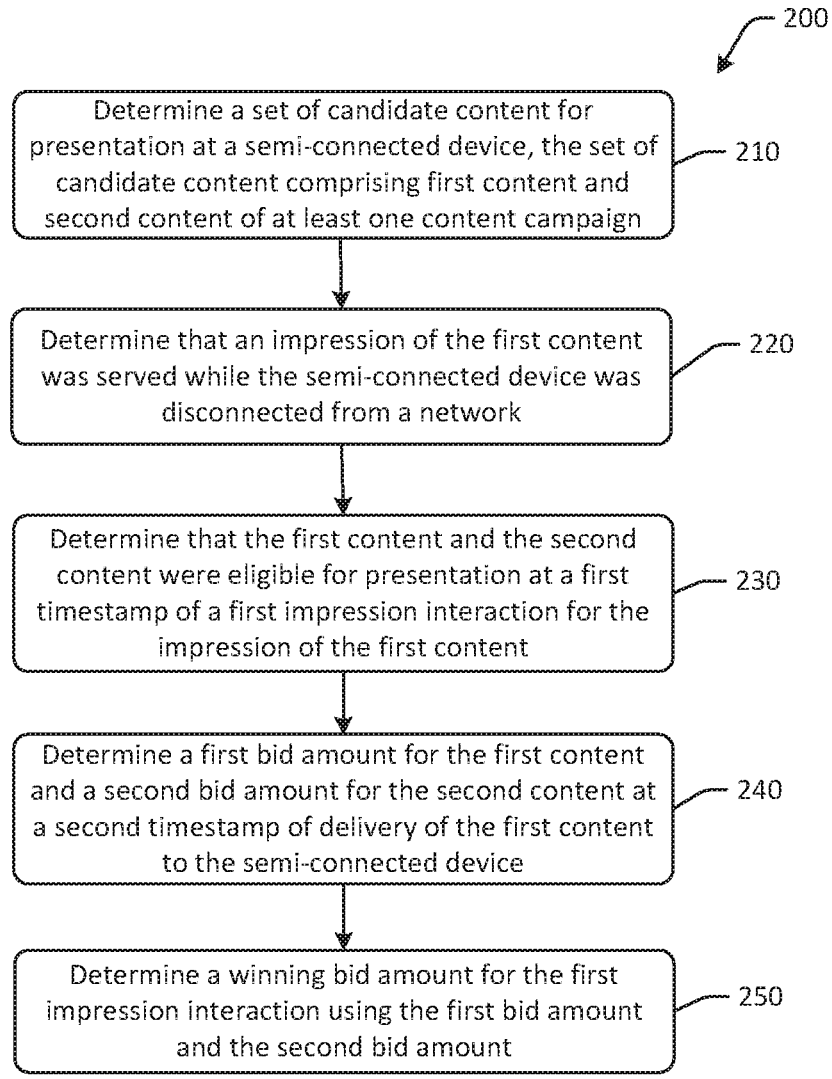
FIG. 2 is an example process flow diagram for decoupled selection of content for semi-connected electronic devices in accordance with one or more embodiments of the disclosure.

Referring to FIG. 2, an example process flow 200 for decoupled selection of content for semi-connected electronic devices in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a content selection server. In certain embodiments, the operations of the process flow 200 may be executed by a semi-connected device. In some embodiments, one or more operations of the process flow 200 may be executed by a remote server, such as a content selection server, and one or more operations of the process flow 200 may be executed by a semi-connected device.

At block 210 of the process flow 200, a set of candidate content for presentation at a semi-connected device is determined, the set of candidate content comprising first content and second content of at least one content campaign. For example, computer-executable instructions of one or more content allocation module(s) stored at a remote server may be executed to determine a set of candidate content for presentation at a semi-connected device. The set of candidate content may include first content and second content of at least one content campaign. For example, the set of candidate content may include first content of a first content campaign and second content of a second content campaign. The set of candidate content may also include, in addition to the first content and the second content, third content of a third content campaign. The set of candidate content may include any number of pieces of content of any number of content campaigns. For example, the set of candidate content may include 3 pieces of content from 3 different content campaigns, 3 pieces of content from 2 different content campaigns, or 3 pieces of content from a single content campaign. In some embodiments, a remote server, such as a content selection server, may determine a set of candidate content for presentation at a semi-connected device.

At block 220 of the process flow 200, it is determined that an impression of the first content was served while the semi-connected device was disconnected from a network. For example, computer-executable instructions of one or more content allocation module(s) stored at a remote server may be executed to determine that an impression of the first content was served while the semi-connected device was disconnected from a network. The occurrence of the impression of the first content being served while the semi-connected device was disconnected from a network may be determined based at least in part on content impression data generated by the semi-connected device and received by a content selection server.

At block 230 of the process flow 200, it is determined that the first content and the second content were eligible for presentation at a first timestamp of a first impression interaction for the impression of the first content. For example, computer-executable instructions of one or more content allocation module(s) stored at a remote server may be executed to determine that the first content and the second content were eligible for presentation at a time of a first impression interaction for the first content. The eligibility of the first content and the second content may be determined retroactively based at least in part on content delivery settings for the first content and the second content and an interaction timestamp indicating the time of the first impression interaction. For example, a content selection server may determine that the first content and the second content were eligible for presentation at the time of the first impression interaction based on respective flight times of the first content and the second content and the interaction timestamp.

At block 240 of the process flow 200, a first bid amount for the first content and a second bid amount for the second content at a second timestamp of delivery of the first content to the semi-connected device are determined. For example, computer-executable instructions of one or more content allocation module(s) stored at a remote server may be executed to determine the first bid amount for the first content and the second bid amount for the second content at the time of delivery of the first content to the semi-connected device. The first bid amount and the second bid amount at the time of delivery of the first content to the semi-connected device may be determined based at least in part on a content history. For example, a content selection server may generate and store a content history related to the first bid amount, the second bid amount, and the time of delivery of the first content and the second content to the semi-connected device. The content history may include a first content identifier, the first bid amount, and a first ranking score, and a download timestamp for the first content, as well as a second content identifier, the second bid amount, and a second ranking score, and a download timestamp for the second content. The content history may be stored at the content selection server or may be accessible to the content selection server. The content selection server may determine the first bid amount and the second bid amount at the time of delivery of the first content to the semi-connected device based at least in part on the first bid amount, the second bid amount, and the first timestamp provided by the content history.

At block 250 of the process flow 200, a winning bid amount for the first impression interaction is determined using the first bid amount and the second bid amount. For example, computer-executable instructions of one or more content allocation module(s) stored at a remote server may be executed to determine the winning bid amount for the first impression interaction using the first bid amount and the second bid amount. The winning bid amount may be determined based at least in part on a ranking of the first content and the second content. For example, a content selection server may rank the first content and the second content based on respective ranking scores for the first content and the second content. The first content may have a first ranking score based at least in part on the first bid amount at the time of delivery of the first content to the semi-connected device, and the second content may have a second ranking score based at least in part on the second bid amount at the time of delivery of the second content to the semi-connected device. The first ranking score and the second ranking score may be determined by the content selection server using the content history. The winning bid amount may be determined based at least in part on the bid amount of the second-ranked content. For example, the content selection server may determine that the first ranking score is greater than the second ranking score, and thus the content selection server may determine the winning bid amount based at least in part on the second bid amount. In some embodiments, the winning bid amount may be sum of the bid amount for the second-ranked content and an additional value, such as 1. Accordingly, if it is determined that the first ranking score is greater than the second ranking score, the winning bid amount for the first impression interaction may be determined to be a sum of the second bid amount and the additional value.

Figure 3:
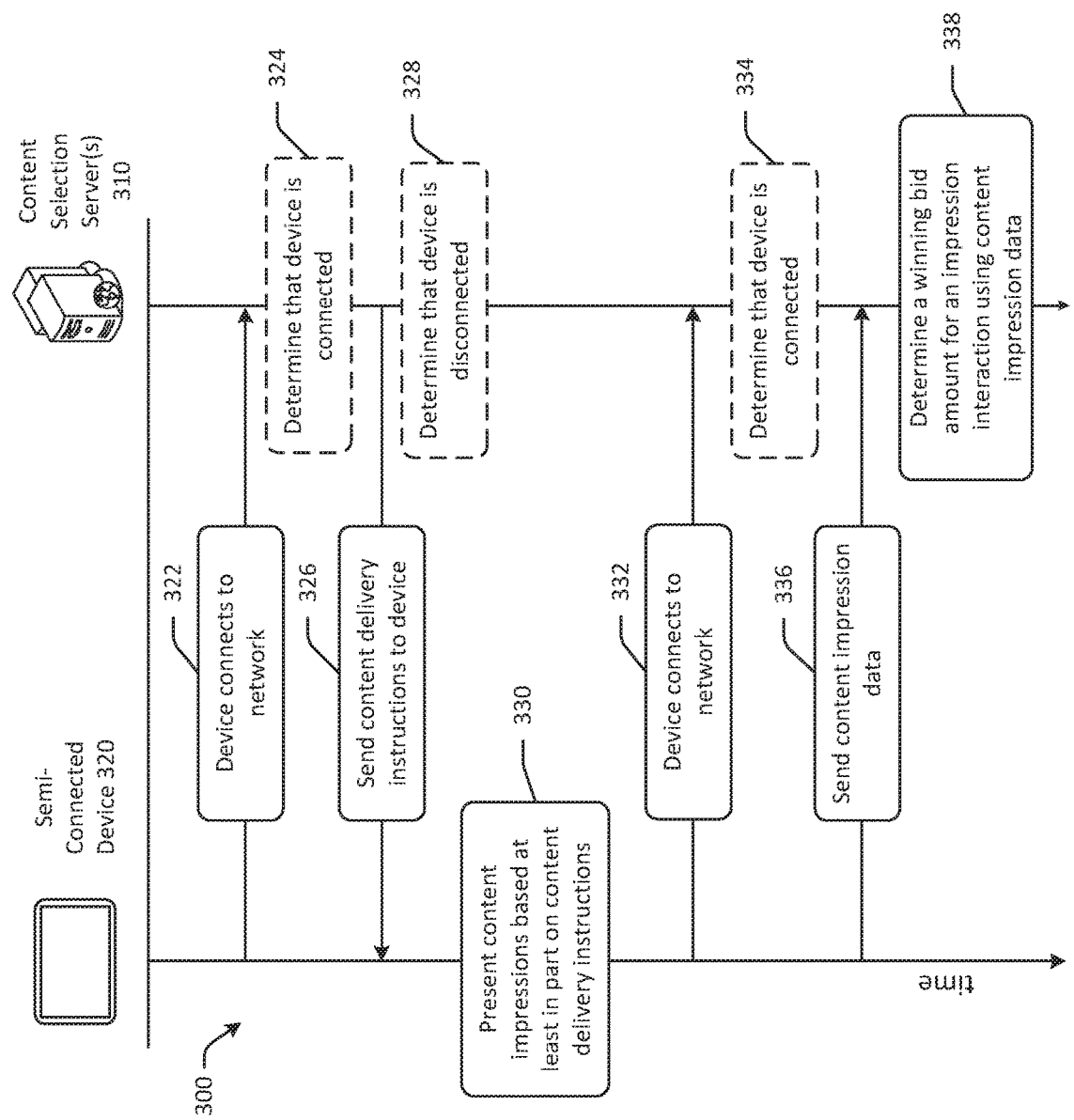
FIG. 3 is an example data flow diagram over time for decoupled selection of content for semi-connected electronic devices in accordance with one or more embodiments of the disclosure.

FIG. 3 depicts an example data flow diagram 300 over time for decoupled selection of content for semi-connected electronic devices in accordance with one or more embodiments of the disclosure. FIG. 3 illustrates example communications and/or operations over time between one or more content selection servers 310 and a semi-connected device 320. Any number of semi-connected devices may be in communication with the content selection server 310. Any of the communications or operations illustrated in FIG. 3 can be performed in any order, concurrently, or partially concurrently.

At a first operation 322, the semi-connected device 320 may connect to one or more networks and/or the content selection server 310. At an optional second operation 324, the content selection server 310 may determine that the semi-connected device 320 is connected. At a third operation 326, the content selection server 310 may send content delivery instructions to the semi-connected device 320. The content delivery instructions may include data related to the respective pieces of content of a set of candidate content for presentation at the semi-connected device 320. The content delivery instructions may include content identifiers for the content to be presented, or may include content files or metadata for presentation as impressions. The content delivery instructions also may include metadata related to the respective pieces of content of the set of candidate content. For example, the content delivery instructions may include metadata relating to a ranking of the pieces of content of the set of candidate content or respective ranking scores for the pieces of content of the set of candidate content. At an optional fourth operation 328, the content selection server 310 may determine that the semi-connected device 320 is disconnected.

At a fifth operation 330, the semi-connected device 320 may present content impressions based at least in part on the content delivery instructions. At a sixth operation 332, the semi-connected device 320 may connect to one or more networks and/or the content selection server 310. At an optional seventh operation 334, the content selection server 310 may determine that the semi-connected device 320 is connected. At an eighth operation 336, the semi-connected device 320 may send content impression data to the content selection server 310. The content impression data may be sent at the end of a time interval, at the next connection after a time interval has elapsed, periodically, after a certain number of impressions have been served, each time the semi-connected device connects to a suitable network, or at another frequency or event occurrence. The content impression data may include, for respective user interaction events with content presented at the semi-connected device 320, an indication of an impression interaction for a piece of content and a time of the impression interaction. For example, the content impression data may include, for respective user interaction events with content presented at the semi-connected device 320, a content identifier for the piece of content and an interaction timestamp indicating the time of the impression interaction.

At a ninth operation 338, the content selection server 310 may determine a winning bid amount for an impression interaction using the content impression data and bid amounts at a time of delivery of the content. For example, the content selection server 310 may receive, from the semi-connected device 320, content impression data that includes an indication of an impression interaction for one of the pieces of content of the set of candidate content for presentation at the semi-connected device 320 and an interaction timestamp indicating the time of the impression interaction. The content selection server 310 may determine a winning bid amount for the impression interaction indicated by the content impression data by determining the set of candidate content for presentation at the semi-connected device at the time of the impression interaction, determining which pieces of content of the set of candidate content were eligible for presentation at the time of the impression interaction, and determining bid amounts for the eligible pieces of content at a time of delivery of the pieces of content to the semi-connected device 320.

Figure 4:
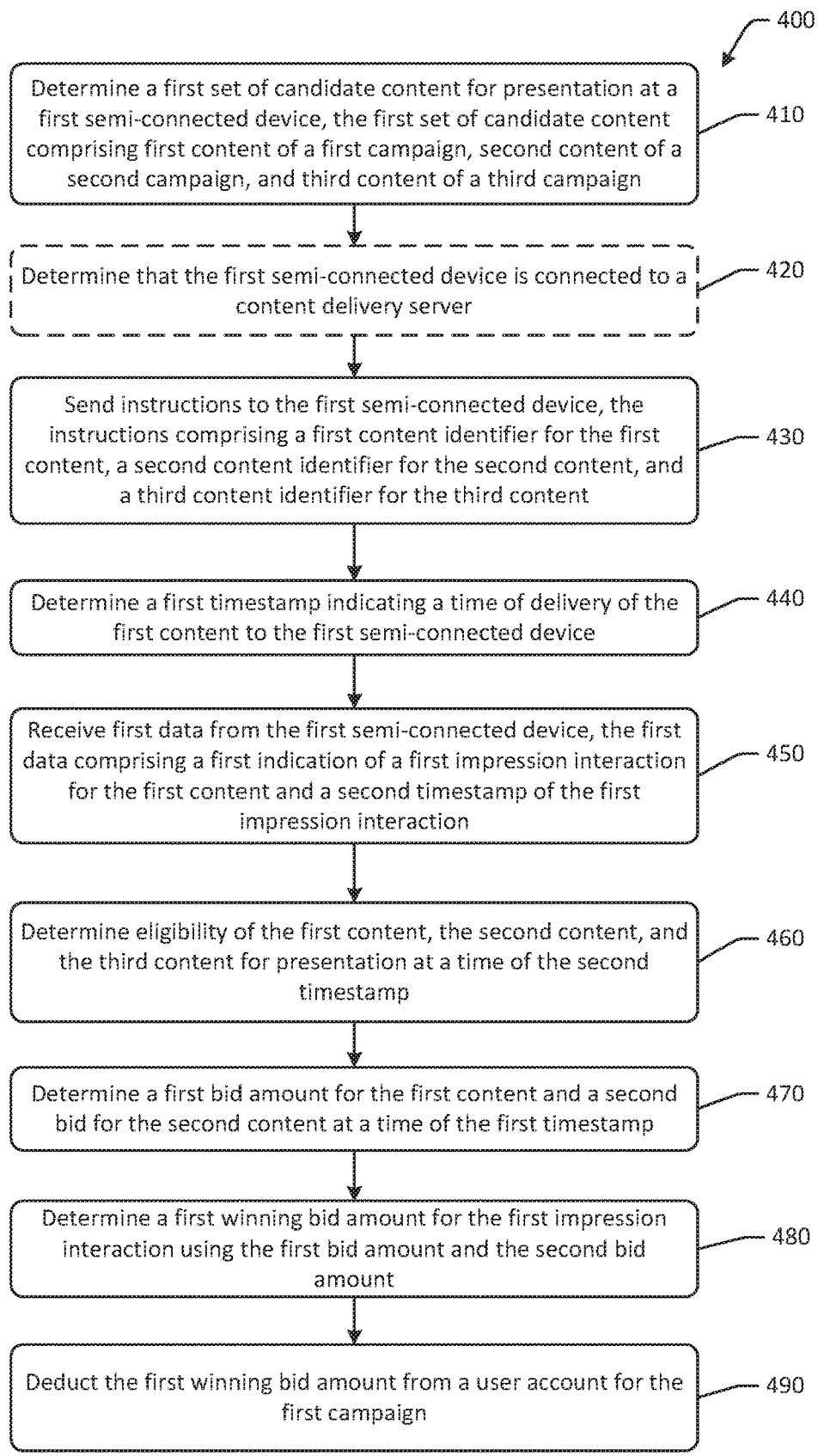
FIG. 4 is an example process flow for decoupled selection of content for semi-connected electronic devices in accordance with one or more embodiments of the disclosure.

FIG. 4 depicts an example process flow 400 for decoupled selection of content for semi-connected electronic devices in accordance with one or more embodiments of the disclosure. Although certain operations are illustrated as occurring separately in FIG. 4, some or all of the operations may occur concurrently or partially concurrently across one or more computer systems. The operations of the process flow 400 may be executed by a remote server, such as a content selection server.

At block 410, a content delivery server may determine a first set of candidate content for presentation at a first semi-connected device. The first set of candidate content may include first content of a first content campaign, second content of a second content campaign, and third content of a third content campaign. The first content, the second content, and the third content may be selected based at least in part on content delivery settings and/or delivery constraints associated with the respective content campaigns.

At block 420, the content delivery server optionally may determine that the first semi-connected device is connected to the content delivery server. The first semi-connected device may connect to or communicate with the content delivery server intermittently or on an irregular basis via one or more networks.

At block 430, the content delivery server may send content delivery instructions to the first semi-connected device. The content delivery instructions may include data related to the first content, the second content, and the third content. For example, the content delivery instructions may include a first content identifier for the first content, a second content identifier for the second content, and a third content identifier for the third content. The content delivery instructions also may include metadata related to the first content, the second content, and the third content. For example, the content delivery instructions may include metadata relating to a ranking of the first content, the second content, and the third content or respective ranking scores for the first content, the second content, and the third content. The first content may have a first ranking score, the second content may have a second ranking score, and the third content may have a third ranking score. The ranking or the ranking scores may be based at least in part on bid amounts for the first content, the second content, and the third content. The first content may have a first bid amount, the second content may have a second bid amount, and the third content may have a third bid amount. As an example, the respective ranking scores may be determined at least in part by multiplying the bid amount for a piece of content by a conversion rate for the piece of content. The conversion rate for a piece of content may be a click-through rate for the piece of content. In other words, the conversion rate for a piece of content may be a ratio of clicks to impressions for the piece of content over a period of time.

At block 440, the candidate selection server may determine a first timestamp indicating a time of delivery of the first content to the first semi-connected device. The first timestamp may be generated at the time of delivery of the first content to the first semi-connected device and received by the content selection server from a content server or the first semi-connected device. The content selection server may generate and store a content history related to the bid amount and the time of delivery of the respective pieces of content to the first semi-connected device. For example, the content history may include the content identifier, the bid amount, the ranking score, and the download timestamp for the respective pieces of content of the set of candidate content delivered to the first semi-connected device.

At block 450, the candidate selection server may receive first content impression data from the first semi-connected device. The first content impression data may include a first indication of a first impression interaction for the first content and a second timestamp of the first impression interaction.

At block 460, the candidate selection server may determine eligibility of the first content, the second content, and the third content for presentation at a time of the second timestamp. The candidate selection server may determine eligibility of the first content, the second content, and the third content for presentation at the time of the second timestamp using content delivery settings for the first content, the second content, and the third content. For example, the content selection server may determine that the first content and the second content were eligible for presentation at the time of the impression interaction based on respective flight times of the first content and the second content and the second timestamp, and the content selection server may determine that the third content was ineligible for presentation at the time of the impression interaction based on the flight time of the third content and the second timestamp.

At block 470, the candidate selection server may determine a first bid amount for the first content and a second bid amount for the second content at a time of the first timestamp. For example, the candidate selection server may retrieve the first bid amount and the second bid amount from the content history.

At block 480, the candidate selection server may determine a first winning bid amount for the first impression interaction using the first bid amount and the second bid amount. The content selection server may rank the first content and the second content based on the first ranking score and the second ranking score. The content selection server may determine the first winning bid amount for the first impression interaction based on the bid amount for the second-ranked piece of content. The content selection server may determine that the first bid amount is greater than the second bid amount and thus may determine the first winning bid amount for the first impression interaction based on the second bid amount. For example, the content selection server may determine the first winning bid amount to be sum of the second bid amount and an additional value, such as 1.

At block 490, the candidate selection server may deduct the first winning bid amount from a user account for the first campaign. In some embodiments, the candidate selection server may deduct a winning bid amount from a user account for the respective campaign only when an account balance of the user account is equal to or greater than the winning bid amount. In certain embodiments, the candidate selection server may determine that the account balance of the user account is less than the winning bid amount and may deduct an amount less than the winning bid amount from the user account for the respective campaign. For example, the content selection server may deduct an amount equal to the account balance from the user account. In certain embodiments, the candidate selection server may determine that the account balance of the user account is less than the winning bid amount and may not deduct any amount from the user account for the respective campaign.

One or more operations of the method, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
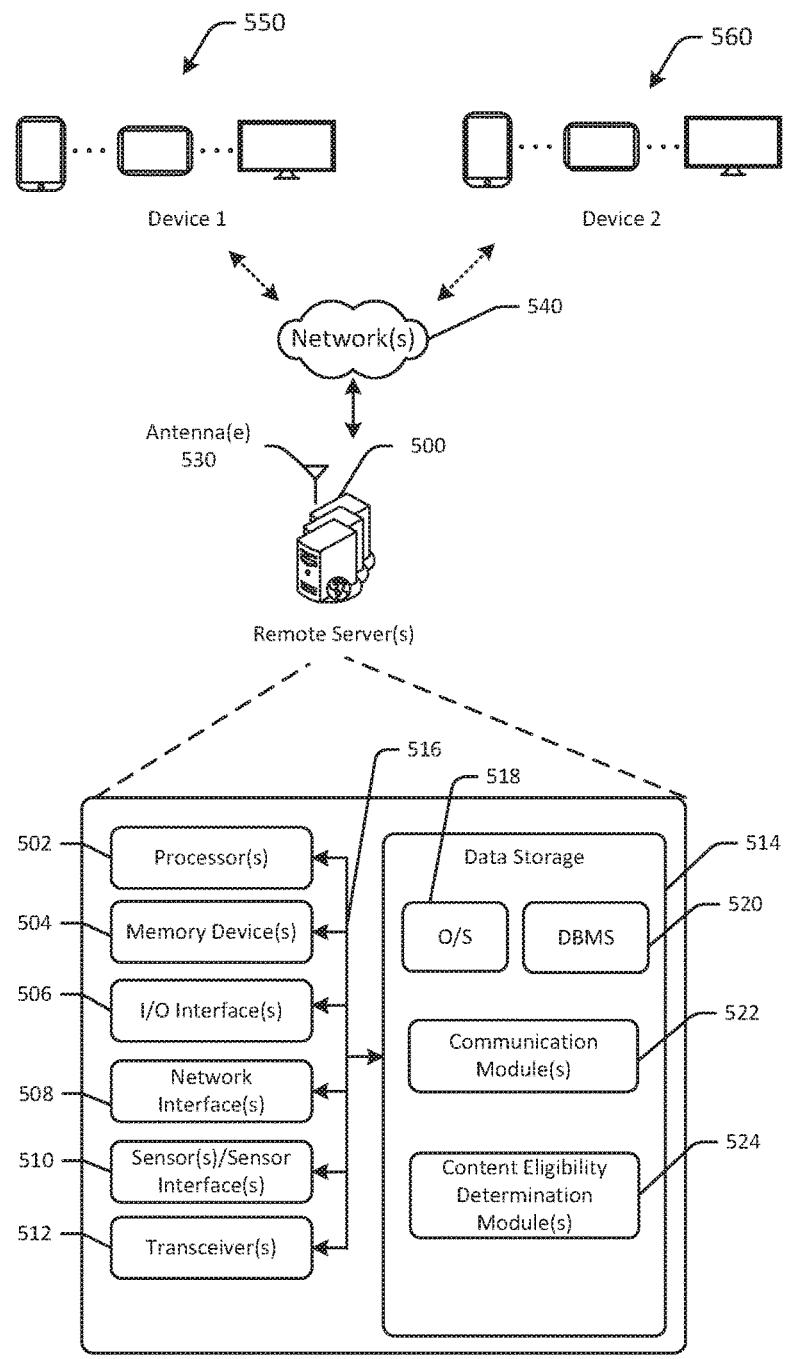
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the content selection server(s) of FIGS. 1-4.

The remote server(s) 500 may be configured to communicate via one or more networks with one or more servers, user devices, or the like. The remote server(s) 500 may be configured to actively or passively manage one or more aspects of a content campaign, such as content delivery parameters, allocation of content impression to respective semi-connected device, and the like. The remote server(s) 500 may be configured to deliver instructions and/or one or more pieces of content and may further be configured to manage content campaigns via at least allocating content impressions to certain semi-connected devices. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more semi-connected devices via the network(s) 540. For example, the remote server(s) 500 may communicate with a first semi-connected device 550 via the network(s) 540 when the first semi-connected device 550 connects to the network(s) 540. The first semi-connected device 550 may connect to the network(s) 540 intermittently. Likewise, the remote server(s) 500 may communicate with a second semi-connected device 560 via the network(s) 540 when the second semi-connected device 560 connects to the network(s) 540. The second semi-connected device 560 may connect to the network(s) 540 intermittently. The remote server(s) 500 may communicate with any number of semi-connected devices.

In an illustrative configuration, the remote server(s) 500 may include one or more processors (processor(s)) 502, one or more memory devices 504 (generically referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth.

Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more content eligibility determination module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, historical device performance data, device profile data, device eligibility data, user profile data, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with semi-connected devices, determining when a certain semi-connected device is available and/or connected, sending or receiving information and instructions, and the like.

The content eligibility determination module(s) 524 may include computer-executable instructions, code, or the like that responsive to execution by one or more of the processor(s) 502 may perform functions including, but not limited to, determining whether a certain user profile associated with a device corresponds to targeting criteria for certain content and/or content campaigns, determining whether a certain content impression can be served at a device in the context of other impressions the device is to serve or has served, determining whether delivery constraints are satisfied (e.g., limits on number of times an impression of certain content can be served, etc.), determining whether a content impression was served and/or interacted with, determining conversion events, identifying applicable campaign constraints, determining constraint compliance, and the like.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 1002.11 family of standards, including via 2.4 GHz channels (e.g., 1002.11b, 1002.11g, 1002.11n), 5 GHz channels (e.g., 1002.11n, 1002.11ac), or 60 GHz channels (e.g., 1002.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-4 may be performed by a device having the illustrative configuration depicted in FIG. 5, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by a server via a network, a set of candidate content for presentation at a semi-connected device, the set of candidate content comprising first content, second content, and third content of at least one content campaign from a user device associated with a campaign manager and/or content creator;
determining, by the server, that the semi-connected device is connected to the server via the network;
transmitting, by the server, instructions to the semi-connected device, the instructions comprising the candidate content and metadata representing a bid amount, a conversion rate, and a rank score associated with each of the candidate content for presentation at the semi-connected device;
receiving, by the server, a download confirmation comprising respective identifiers associated with the first content, the second content, and the third content downloaded at the semi-connected device at a first timestamp of delivery of the candidate content at the semi-connected device;
determining, by the server, that the semi-connected device is reconnected to the server;

in response to determining the semi-connected device is reconnected, receiving, by the server, impression data comprising timestamps indicating a time of impression interaction corresponding to the first content, the second content, and the third content when the semi-connected device was disconnected;

determining, by the server, a retroactive cost for each impression served at the semi-connected device based on determining the set of candidate content for presentation at the semi-connected device at the time of the impression interaction, determining eligible content from the set of candidate content at the time of the impression interaction, and determining bid amounts for the eligible content at the first timestamp of delivery; and transmitting, by the server, accurate feedback to the user device regarding bidding behaviors for user interaction with content impressions.

2. The method of claim 1, wherein further comprising:
ranking the first content, the second content, and the third content using respective bid amounts; and
determining an order of presentation for the set of candidate content using the ranking.

3. The method of claim 2, further comprising:
determining that at least one of the respective bid amounts has been modified;
determining a modified bid amount for the first content, a modified bid amount for the second content, and a third bid amount for the third content; and
ranking the first content, the second content, and the third content using the respective modified bid.

4. The method of claim 1, further comprising:
determining that the semi-connected device is connected to the network; and
sending a first content identifier for the first content and a second content identifier for the second content to the semi-connected device.

5. The method of claim 1, further comprising:
generating a log of respective bid amounts the timestamp of delivery of the first content to the semi-connected device.

6. The method of claim 1, further comprising:
determining a first ranking score for the first content using a first bid amount;
determining a second ranking score for the second content using a second bid amount;
determining that the semi-connected device is connected to the network; and
sending the first ranking score and the second ranking score to the semi-connected device.

7. The method of claim 1, further comprising:
determining that the semi-connected device is connected to the network; and
receiving first data from the semi-connected device, the first data comprising the first timestamp and a first indication of the first impression interaction.

8. The method of claim 1, further comprising:
determining that the third content was ineligible for presentation at the first timestamp.

9. The method of claim 1, further comprising:
(i) deducting winning bid amount from a first user account for a first content campaign of the at least one content campaign; or
(ii) determining that an account balance of the first user account is less than the winning bid amount; and
deducting an amount less than the winning bid amount from the first user account.

10. The method of claim 1, wherein the semi-connected device comprises one or more computer processors coupled to at least one memory.

11. A device comprising:
at least one memory that stores computer-executable instructions; and
at least one processor configured to access the at least one memory and execute the computer-executable instructions to:
receive a set of candidate content for presentation at a semi-connected device, the set of candidate content comprising first content, second content, and third content of at least one content campaign from a user device associated with a campaign manager and/or content creator;
determine that the semi-connected device is connected via a network;
transmit instructions comprising the candidate content and metadata representing a bid amount, a conversion rate, and a rank score associated with each of the candidate content for presentation at the semi-connected device;
receive a download confirmation comprising respective identifiers associated with the first content, the second content, and the third content downloaded at the semi-connected device at a first timestamp of delivery of the candidate content at the semi-connected device;
determine that the semi-connected device is reconnected;
in response to determining the semi-connected device is reconnected, receive impression data comprising timestamps indicating a time of impression interaction corresponding to the first content, the second content, and the third content when the semi-connected device was disconnected;
determine a retroactive cost for each impression served at the semi-connected device based on determining the set of candidate content for presentation at the semi-connected device at the time of the impression interaction, determining eligible content from the set of candidate content at the time of the impression interaction, and determining bid amounts for the eligible content at the first timestamp of delivery; and
transmit accurate feedback to the user device regarding bidding behaviors for user interaction with content impressions.

12. The device of claim 11, wherein the at least one processor is further configured to access the at least one memory and execute the computer-executable instructions to:
rank the first content, the second content, and the third content using respective bid amounts; and
determine an order of presentation for the set of candidate content using the ranking.

13. The device of claim 11, wherein the at least one processor is further configured to access the at least one memory and execute the computer-executable instructions to:
send a first content identifier for the first content and a second content identifier for the second content to the semi-connected device;
determine that the semi-connected device is disconnected from the network; and receive first data from the semi-connected device, the first data comprising the first timestamp and a first indication of the first impression interaction.

\* \* \* \* \*